Patented July 5, 1949

2,474,822

UNITED STATES PATENT OFFICE 2,474,822

QUINOLINE COMPOUNDS AND PROCESS OF MAKING SAME

Joseph H. Burckhalter, Detroit, Eldon M. Jones and Albert L. Rawlins, Grosse Pointe Woods, Frank H. Tendick, Grosse Pointe Park, and Walter F. Holcomb, Detroit, Mich., assignors to Parke, Davis & Company, Detroit, Mich., a corporation of Michigan No Drawing. Application November 5, 1945, Serial No. 626,907

15 Claims. (Cl. 260—286)

This invention relates to certain new and useful quinoline compounds and to methods for obtaining the same. More particularly, the invention relates to quinoline compounds having the formula,

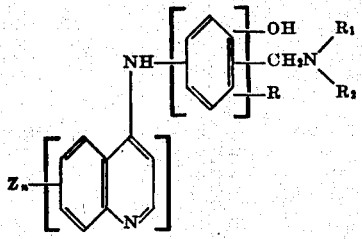

when Z is hydrogen, halogen, —CN, —COOH, —COO(lower alkyl), —OH, lower alkyl or lower alkoxy, $n$ being 1, 2 or 3, R is hydrogen, halogen, —OH, lower alkylene or lower alkyl, $R_1$ and $R_2$ are the same or different alkyl radicals containing 5 to 10 carbon atoms inclusive.

These new compounds are useful therapeutic agents and, in general, they are characterized by their toxicity to plasmodia. These compounds may be used either in the form of their bases or their salts with organic or inorganic acids such as hydrochloric acid, sulfuric acid, phosphoric acid, sulfamic acid, acetic acid, lactic acid, tartaric acid, gluconic acid, citric acid and alkyl sulfonic acids or as the insoluble salt of methylene disalicylic acid.

This application is a continuation-in-part of our copending application, Serial No. 539,990, filed June 12, 1944, now Patent No. 2,428,355, issued Oct. 7, 1947.

The compounds of the present invention may be prepared by the reaction of a substituted aminophenol of the formula,

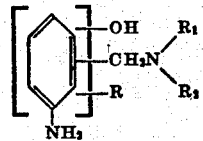

with a 4-haloquinoline compound of the formula,

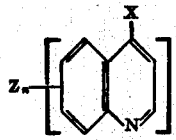

where Z, $n$, R, $R_1$ and $R_2$ have the same significance as given above and X is a chlorine or bromine atom.

The reaction may be carried out by reacting approximately equimolar quantities of the 4-haloquinoline and the substituted aminophenol in a suitable solvent. Such solvents are, in general, water, water-miscible organic solvents and mixtures of water and water-miscible organic solvents. Some of the water-miscible solvents which we may use are low molecular weight alcohols such as methanol, ethanol and n-propanol, low molecular weight ketones such as acetone and methyl ethyl ketone, and ethers such as dioxane and ethylene glycol monethyl ether.

We prefer to carry out the above reaction in the presence of an acidic catalyst. Such catalysts are dilute and concentrated organic acids, phenols and dilute inorganic acids. Some of the organic acids which we may use are acetic, propionic, butyric and the like acids. When the reaction is carried out in the presence of a concentrated organic acid or a phenol, the acid or phenol serves both as the catalyst and as the solvent. Some of the phenols which we may employ to effect the reaction are phenol, o-cresol, p-cresol, mixed cresols and the like. The inorganic acids which we use are, in general, mineral acids such as hydrochloric, hydrobromic, sulfuric, phosphoric and like acids.

A modification of our process for obtaining these new compounds involves the use of an N-acyl derivative of the substituted aminophenol. In this modification the acyl derivative is hydrolyzed to the aromatic amine under acidic conditions and the amine so formed caused to react simultaneously or subsequently with the 4-haloquinoline compound. This is illustrated by the following two equations employing the acetyl derivative of the substituted aminophenol.

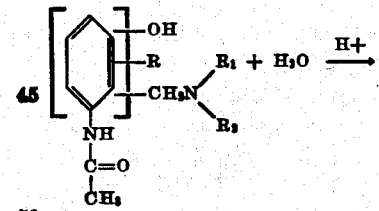

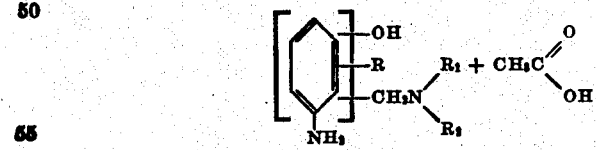

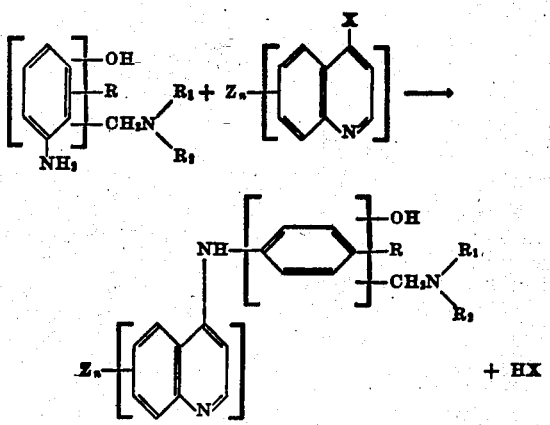

when Z, n, R, R₁, R₂ and X have the significance as given above.

The invention is illustrated by the following examples.

*Example 1.—4-(3'-di-n-amylaminomethyl-4'-hydroxyanilino)-7-chloroquinoline*

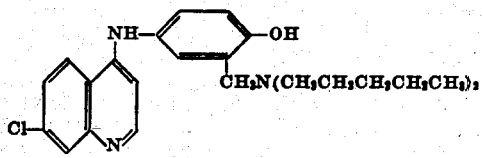

28.5 g. of crude 2-di-n-amylaminomethyl-4-acetyl-aminophenol is refluxed with 25 cc. of concentrated hydrochloric acid in 30 cc. of isopropanol for one hour, cooled and the pH of the solution adjusted to 4 by the addition of dilute sodium hydroxide solution. 17.6 g. of 4,7-dichloroquinoline is added and the mixture refluxed for two hours. The oily dihydrochloride which separates on cooling is removed and stirred in acetone and ether whereupon it crystallizes. The crude dihydrochloride is purified by recrystallization from either methanol or ethanol; M. P. 220–23° C.

*Example 2.—4-(3'di-n-hexylaminomethyl-4'-hydroxyanilino)-7-chloroquinoline*

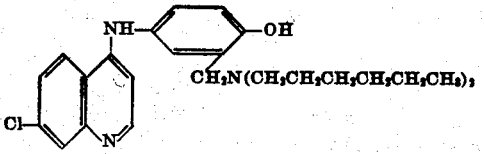

36.5 g. of 2-di-n-hexylaminomethyl-4-acetyl-aminophenol is heated with 200 cc. of 6 N hydrochloric acid for two hours, diluted with 150 cc. of water and the solution made just acid to Congo red by the addition of sodium hydroxide solution. 20.8 g. of 4,7-dichloroquinoline is added and the mixture refluxed for two hours. The mixture is cooled, made alkaline with sodium hydroxide and extracted with ether. The ether extract is washed and evaporated to dryness. The residue is taken up in hot dilute ethanol, charcoaled, filtered and the filtrate cooled. The free base which crystallizes is purified by recrystallization from either methanol or ethyl acetate-digroin mixture; M. P. 137–8° C.

17.5 g. of the free base of 4-(3'-di-n-hexylaminomethyl-4'-hydroxyanilino)-7-chloroquinoline is taken up in alcoholic hydrogen chloride and the solution diluted with acetone. The crystalline dihydrochloride which separates is purified by recrystallization from ethanol-acetone mixture; M. P. 220° C.

*Example 3.—4-(3'di-n-heptylaminomethyl-4-hydroxyanilino)-7-chloroquinoline*

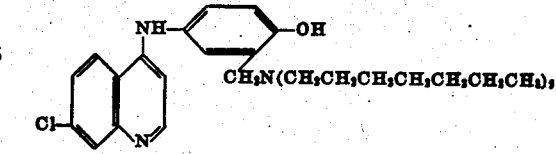

45 g. of 2-di-n-heptylaminomethyl-4-acetyl-aminophenol is refluxed with 200 cc. of 6 N hydrochloric acid and 200 cc. of ethanol for one hour. The solution is cooled and made just acid to Congo red by the addition of sodium hydroxide solution. 23.7 g. of 4,7-dichloroquinoline is added and the mixture refluxed for two hours. After cooling, the solution is made alkaline with sodium hydroxide solution and extracted with ether. The ether extracts are washed with dilute sodium hydroxide solution, then with water and dried. The ether is evaporated and the residue which consists of the crude free base purified by recrystallization from ethanol-methanol mixture; M. P. 132° C.

20 g. of the free base is suspended in methanol and converted to the dihydrochloride by treatment with alcoholic hydrogen chloride. The product is precipitated with acetone and purified by recrystallization from methanol-acetone mixture; M. P. 202–3° C.

*Example 4.—4-(3'-di-n-octylaminomethyl-4'-hydroxyanilino)-7-chloroquinoline*

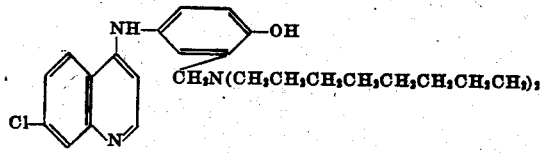

45 g. of 2-di-n-octylaminomethyl-4-acetylaminophenol is refluxed for one hour with 200 cc. of ethanol and 200 cc. of 6 N hydrochloric acid. 22 g. of 4,7-dichloroquinoline dissolved in 100 cc. of ethanol is added and the mixture refluxed for two hours. The reaction mixture is evaporated to dryness, treated with an excess of dilute sodium hydroxide solution and the mixture extracted with ether. The ether extracts are washed, dried and the ether distilled. The residue is taken up in alcoholic hydrogen chloride, the dihydrochloride of the product precipitated with acetone and purified by recrystallization from alcohol-acetone mixture; M. P. 193–5° C.

The base is prepared by stirring 11.5 g. of the dihydrochloride with 300 cc. of water and adding an excess of dilute sodium hydroxide solution. The base is extracted with ether, the extracts dried and the ether distilled. The crude free base is purified by recrystallization from ligroin or from methanol; M. P. 128–9° C.

*Example 5.—3-methyl-4-(3'-di-n-hexylaminomethyl-4'-hydroxyanilino-7-chloroquinoline*

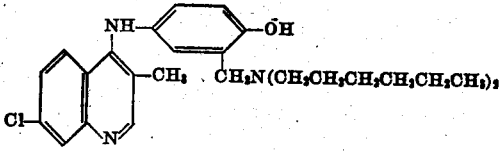

40 g. of 2-di-n-hexylaminomethyl-4-acetyl-aminophenol is refluxed for one hour with 200 cc. of ethanol and 200 cc. of 6 N hydrochloric acid, cooled and the pH of the solution adjusted to 4 by the addition of dilute sodium hydroxide solution. 24.3 g. of 3-methyl-4,7-dichloroquinoline is added and the mixture refluxed for three hours. The solution is cooled, made alkaline with sodium hydroxide solution and extracted with ether. The ether extract is washed with water, dried and ether evaporated. The residue is taken up in absolute alcohol and an excess of dry hydrogen chloride in absolute alcohol added. The dihydrochloride salt is precipitated by the addition of acetone. The crude product is collected and purified by recrystallization from methanol-acetone mixture.

*Example 6.—4-(3'di-n-amylaminomethyl-4'-hydroxyanilino)-6-methoxyquinoline*

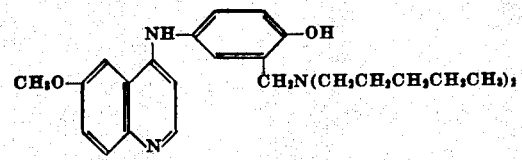

20 g. of 2-di-n-amylaminomethyl-4-aminophenol is dissolved in 100 cc. of 3 N hydrochloric acid and the solution made just acid to Congo red by the addition of sodium hydroxide solution. 12.6 g. of 4-chloro-6-methoxyquinoline is added, mixture refluxed for two hours, cooled and made alkaline with sodium hydroxide solution. The mixture is extracted with chloroform, the chloroform extracts dried and the chloroform distilled off. The residue is taken up in methanol and an excess of dry hydrogen chloride gas passed through the solution. The hydrochloride is precipitated by the addition of acetone, collected and purified by recrystallization from methanol-acetone mixture.

*Example 7.—4-(3'-di-5''-methylhexylaminomethyl-4'-hydroxyanilino)-6,7-dimethylquinoline*

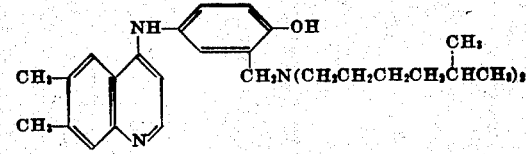

40 g. of 2-di-5'-methylhexylaminomethyl-4-acetylaminophenol is refluxed with 200 cc. of 6 N hydrochloric acid and 200 cc. of ethanol for one hour. The pH of the solution is adjusted to about 4 by the addition of sodium hydroxide solution and 21.9 g. of 4-chloro-6,7-dimethylquinoline is added. The reaction mixture is refluxed for two hours, cooled and made alkaline with sodium hydroxide solution. The oily product which separates is extracted with ether and the ether extract dried. The ether is removed by distillation and the residue taken up in alcoholic hydrogen chloride solution. The dihydrochloride salt is precipitated by the addition of acetone, collected and purified by recrystallization from methanol.

*Example 8.—4-(2'-hydroxy-3'-di-n-amylaminomethyl-5'-chloroanilino)-7-bromoquinoline*

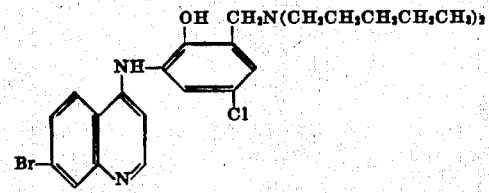

35 g. of 2-di-n-amylaminomethyl-4-chloro-6-acetylaminophenol is refluxed for one hour with 150 cc. of 6 N hydrochloric acid and 200 cc. of ethanol. The solution is made just acid to Congo red by the addition of sodium hydroxide solution. 24 g. of 4-chloro-7-bromoquinoline is added and the resultant mixture refluxed for two hours. The mixture is cooled, made alkaline with sodium hydroxide solution and extracted with ether. The ether extract is dried and then an excess of dry hydrogen chloride gas bubbled into the solution. The dihydrochloride which precipitates is removed by filtration and purified by recrystallization from methanol-acetone mixture.

*Example 9.—4-(2'-bromo-4'-di-n-amylaminomethyl-5'-hydroxyanilino)-7-cyanoquinoline*

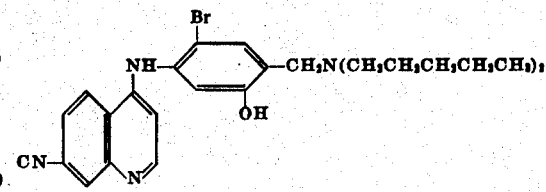

18.5 g. of 4-chloro-7-cyanoquinoline is dissolved in 120 g. of phenol and then 35 g. of 2-di-n-amylaminomethyl-4-bromo-5-aminophenol is added to the solution with stirring. The mixture is heated at 110° C. for four hours, cooled and treated with 10 cc. of alcoholic hydrogen chloride. The reaction mixture is added to a large volume of acetone, the precipitated dihydrochloride removed by filtration and purified by recrystallization from methanol.

*Example 10.—4-(3'-di-n-amylaminomethyl-4'-hydroxy-5'-allylanilino)-5-8-methoxyquinoline*

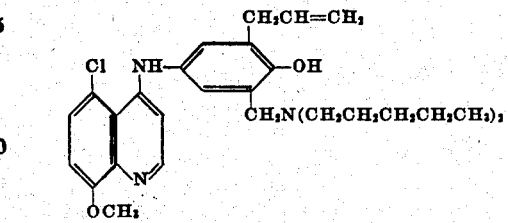

40 g. of 2-di-n-amylaminomethyl-4-acetylamino-6-allylphenol is refluxed with 200 cc. of 6 N hydrochloric acid for two hours, diluted with 200 cc. of water and the solution made just acid to Congo red by the addition of sodium hydroxide solution. 25.4 g. of 4,5-dichloro-8-methoxyquinoline is added and the mixture refluxed for two hours. After cooling, the solution is made alkaline with sodium hydroxide and extracted with ether. The ether extracts are washed with dilute sodium hydroxide solution, then with water and dried. The ether is evaporated and the residue, which consists of the crude free base, purified by recrystallization from either methanol or ethyl acetate-ligroin mixture.

*Example 11.—3-carbethoxy-4(3'-di-n-amylaminomethyl-4'-hydroxyanilino)-6-methoxyquinoline*

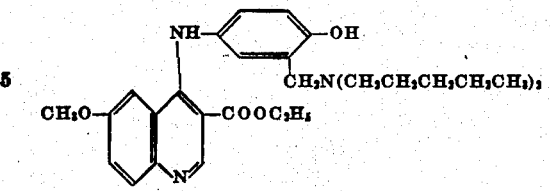

35 g. of 2-di-n-amylaminomethyl-4-aminophenol is dissolved in 250 cc. of absolute ethanol and the resulting solution treated with an excess of dry hydrogen chloride gas. 25 g. of 3-carbethoxy-4-chloro-6-methoxyquinoline and 200 cc. of ethanol are added and the mixture refluxed for two hours. Acetone is added, the precipitated dihydrochloride removed by filtration and purified by recrystallization from absolute ethanol.

The intermediate aminomethylaminophenols are usually prepared from acylaminophenols by means of the Mannich reaction. (Organic Reactions, John Wiley and Sons, Inc., New York, 1942, vol. 1, page 303). This particular application of the reaction consists in the condensation of secondary amines with formaldehyde and acylaminophenols having at least one unsubstituted position ortho or para to the phenolic hydroxyl. The resulting N-substituted aminomethyl acylaminophenols are hydrolyzed with mineral acid to the corresponding aminomethyl aminophenols. The same intermediates can be prepared by catalytic or nascent hydrogen reduction of aminomethyl nitrophenols, also obtained by means of the Mannich reaction.

The 4-haloquinolines used as starting materials can be prepared by the method of Magidson and Rubstov [J. Gen. Chem. (U.S.S.R.), 7, 1896 (1937); C. A., 32, 564 (1938)] or from the corresponding hydroxyquinolines which may be prepared by the method of Gould and Jacobs [J. Am. Chem. Soc., 61, 2890 (1939)] or by that of Theos J. Thompson [M. S. Thesis, University of Nebraska, July 24, (1942)]. The 3-substituted-4-hydroxyquinolines are prepared by the method given in U. S. Patent No. 2,233,970 while the corresponding 2-substituted-4-hydroxyquinolines are prepared by the well-known Conrad-Limpach reaction.

Attention is directed to our copending applications Serial No. 556,496, filed Sept. 29, 1944; Serial No. 576,900, filed Feb. 8, 1945; Serial No. 626,908, filed Nov. 5, 1945; and Serial No. 722,474, filed Jan. 16, 1947. Attention is also directed to our copending application Serial No. 626,906, filed Nov. 5, 1945, wherein certain quinoline compounds falling within the scope of the instant claims are claimed and an alternative process for preparing the compounds of the instant case is described and claimed.

What we claim as our invention is:

1. A compound of the class consisting of a free base and its acid addition salts, said free base having the formula,

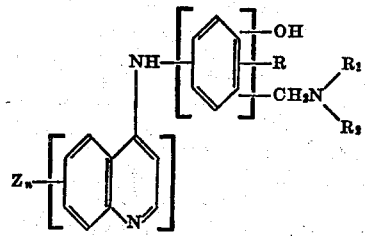

where Z is a member of the class consisting of hydrogen, halogen, —CN, —COO(lower alkyl), lower alkyl and lower alkoxy, $n$ is one of the integers consisting of 1 and 2, R is a member of the class consisting of hydrogen, halogen and lower alkenyl radicals and R₁ and R₂ are members of the class consisting of alkyl radicals containing 5 to 10 carbon atoms inclusive, the

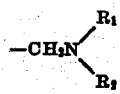

group being attached to the aryl nucleus in one of the positions ortho and para to the hydroxyl group.

2. An acid addition salt of a compound having the formula,

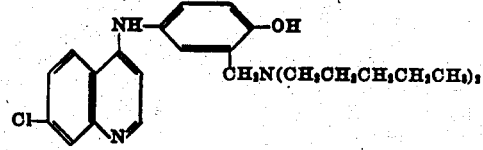

3. An acid addition salt of a compound having the formula,

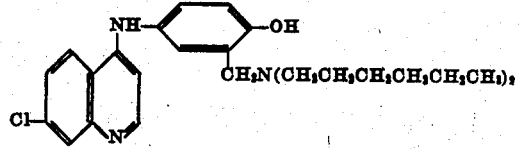

4. An acid addition salt of a compound having the formula,

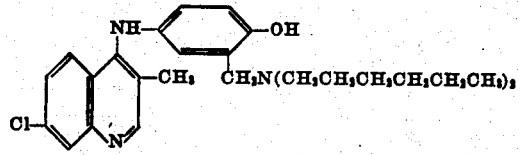

5. A compound of the formula,

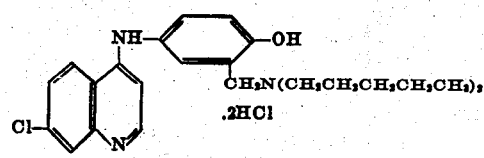

6. A compound of the formula,

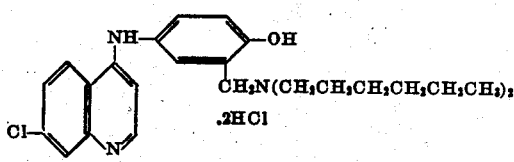

7. A compound of the formula,

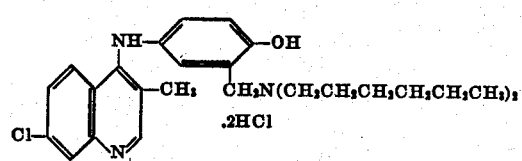

8. Process for obtaining a compound of the formula,

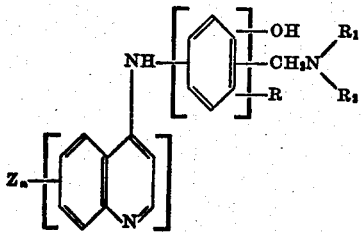

which comprises reacting a 4-haloquinoline compound of the formula,

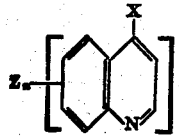

with a substituted aminophenol of the formula,

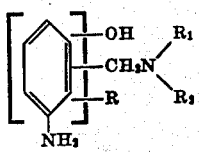

where X is a member of the class consisting of chlorine and bromine, Z is a member of the class consisting of hydrogen, halogen, —CN, —COO (lower alkyl), lower alkyl and lower alkoxy, $n$ is one of the integers consisting of 1 and 2, R is a member of the class consisting of hydrogen, halogen and lower alkenyl radicals and $R_1$ and $R_2$ are members of the class consisting of alkyl radicals containing 5 to 10 carbon atoms inclusive, the

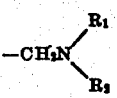

group being attached to the aryl nucleus in one of the positions ortho and para to the hydroxyl group.

9. Process for obtaining a compound of the formula,

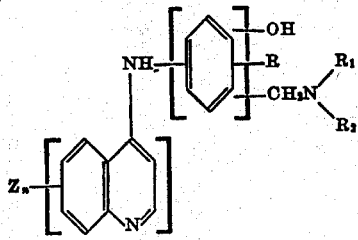

which comprises reacting a 4-haloquinoline compound of the formula,

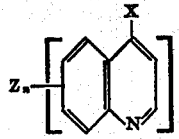

with a substituted aminophenol of the formula,

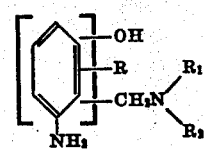

in the presence of acid, where X is a member of the class consisting of chlorine and bromine, Z is a member of the class consisting of hydrogen, halogen, —CN, —COO(lower alkyl), lower alkyl and lower alkoxy, $n$ is one of the integers consisting of 1 and 2, R is a member of the class consisting of hydrogen, halogen and lower alkenyl radicals and $R_1$ and $R_2$ are members of the class consisting of alkyl radicals containing 5 to 10 carbon atoms inclusive, the

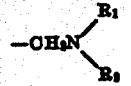

group being attached to the aryl nucleus in one of the positions ortho and para to the hydroxyl group.

10. Process for obtaining a compound of the formula,

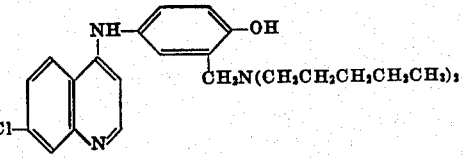

which comprises reacting 4,7-dichloroquinoline with 2-(di-n-amylaminomethyl)-4-aminophenol in the presence of a dilute mineral acid.

11. Process for obtaining a compound of the formula,

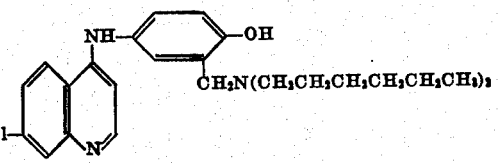

which comprises reacting 4,7-dichloroquinoline with 2-di-n-hexylaminomethyl)-4-aminophenol in the presence of a dilute mineral acid.

12. Process for obtaining a compound of the formula,

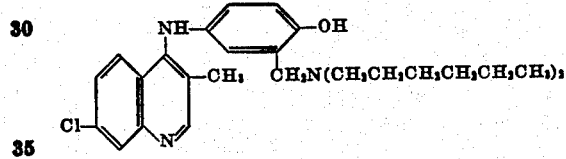

which comprises reacting 3-methyl-4,7-dichloroquinoline with 2-(di-n-hexylaminomethyl)-4-aminophenol in the presence of a dilute mineral acid.

13. A hydrohalide salt of 4-[3'-di-n-amylaminomethyl-4'-hydroxyanilino] - 7 - chloroquinoline.

14. A hydrohalide salt of 4-[3'-di-n-hexylaminomethyl-4'-hydroxyanilino] - 7 - chloroquinoline.

15. A hydrohalide salt of 3-methyl-4-[3'-di-n-hexylaminomethyl-4'-hydroxyanilino]-7 - chloroquinoline.

JOSEPH H. BURCKHALTER.
ELDON M. JONES.
ALBERT L. RAWLINS.
FRANK H. TENDICK.
WALTER F. HOLCOMB.

REFERENCES CITED

The following references are of record in the file of this patent:

UNITED STATES PATENTS

| Number | Name | Date |
|---|---|---|
| 1,891,980 | Hartmann | Dec. 27, 1932 |
| 1,896,461 | Muth | Feb. 7, 1933 |
| 1,902,103 | Schonhofer | Mar. 21, 1933 |